United States Patent [19]

Yun et al.

[11] Patent Number: 5,682,592
[45] Date of Patent: Oct. 28, 1997

[54] FABRICATION METHOD FOR PASTE-TYPE METAL HYDRIDE ELECTRODE

[75] Inventors: Kyung Suk Yun; Byung Won Cho; Won Il Cho; Chi Hum Paik, all of Seoul, Rep. of Korea

[73] Assignee: Korea Institute of Science and Technology, Seoul, Rep. of Korea

[21] Appl. No.: 682,058

[22] Filed: Jul. 16, 1996

[51] Int. Cl.$^6$ .................................................. B22F 1/00
[52] U.S. Cl. .................................................. 419/65
[58] Field of Search .................................................. 419/65

[56] References Cited

U.S. PATENT DOCUMENTS

| | | |
|---|---|---|
| 5,096,667 | 3/1992 | Fetcenko . |
| 5,104,617 | 4/1992 | Fetcenko et al. . |
| 5,554,456 | 9/1996 | Ovshinsky et al. ........................ 429/59 |
| 5,556,719 | 9/1996 | Hong et al. ........................ 429/218 |
| 5,558,950 | 9/1996 | Ovshinsky et al. ........................ 429/101 |
| 5,575,831 | 11/1996 | Yamamura et al. ........................ 75/614 |
| 5,578,266 | 11/1996 | Takai et al. ........................ 420/83 |

OTHER PUBLICATIONS

Okkado Taisoh, Soda and Chlorine, No. 10, 1990.
T. Sakai et al, Electrochemical Science and Technology, 134,558, 1987.

Primary Examiner—Charles T. Jordan
Assistant Examiner—Anthony R. Chi
Attorney, Agent, or Firm—Lowe, Price, LeBlanc & Becker

[57] ABSTRACT

A fabrication method for a paste-type metal hydride electrode for a nickel/metal hydride battery which includes; pulverizing a V-Ti-Zr-Ni-type and Mm-type hydrogen storage alloy in which a small amount of Pd and/or Ru are combined; mixing K.B.(or Ni powder)+PTFE+CMC (HPMC) undiluted paste solution with the hydrogen storage alloy powder, filling a porous nickel with the mixed paste, drying the paste-filled porous nickel, and press-forming the dried paste and which, by providing the paste-type electrode fabrication, is capable of not lowering the electrode capacity by preventing the oxidation of active material and poor conductivity and has the effect of a preventing significant decrease of the electrode capacity, a remarkable increase in cycle life of electrode, and the realization of a paste-type fabrication of an $AB_2$ type alloy in accordance with a new paste composition and hydrogen storage alloy composition, which has previously been regarded as impossible.

5 Claims, 3 Drawing Sheets

FABRICATION METHOD FOR PASTE-TYPE METAL HYDRIDE ELECTRODE

BACKGROUND OF THE INVENTION

1. Field of the Invention

The present invention relates to a fabrication method for a paste-type metal hydride electrode for a nickel/metal hydride battery, and more particularly to an desired fabrication method for a paste-type metal hydride electrode for a nickel/metal hydride battery which is capable of enhancing an electrode capacity and processing ability by fabricating the paste-type metal hydride electrode by filling in a porous nickel, drying, coating and press-forming after mixing a hydrogen storage alloy powder with an undiluted paste solution, and of improving a stability and a cycle life of an electrode by preventing the detachment of electrode active material by micronizing of hydrogen storage alloy.

2. Description of the Conventional Fabrication Method

The conventional fabrication method of a metal hydride electrode employs two fabrication methods. One fabrication method of a press-type electrode is by press-forming and then sintering a V-Ti-Zr-Ni-type alloy powder which is mainly used by the OBC corporation in the United States of America., and the other fabrication method is a paste method by mixing a binder (a binding material) after mixing an Mm-type alloy powder with a conductive material, or a microencapsulation thereof. [Okkado Taisoh, Soda and Chlorine, No.10, 343(1990); T. Sakai et al., J. Electrochem. Soc. 134,558(1987); U.S. Pat. No. 5,096,667; U.S. Pat. No. 5,104,617].

The above-mentioned first fabrication method of press-forming and sintering a V-Ti-Zr-Ni-type alloy powder has an advantage that the electrode capacity is high since the alloy powder is fabricated without a conductive material or a binding material, but, at the same time, the fabrication method thereof has a problem that a special high-pressure press-forming apparatus and a sintering apparatus are needed. In addition, the electrode is difficult to treat since the electrode is manufactured without a binding material, and cycly life of electrode is sharply diminished due to the detachment of an electrode active material by micronizing of hydrogen storage alloy.

The second fabrication method for a paste-type electrode has an advantage that cycle life of electrode is enhanced since the electrode is easier to treat and the detachment of an electrode active material is less than in the conventional fabrication method, but it has disadvantage that an electrode capacity is lowered due to an excessive addition of a conductive material or a binding material.

SUMMARY OF THE INVENTION

Accordingly, it is an object of the present invention to provide a fabrication method of a paste-type metal hydride electrode for a nickel/metal hydride battery capable of effectively enhancing the stability, cycle life, and processing ability of the electrode by preventing the detachment of electrode active material by micronizing of hydrogen storage alloy and capable of enhancing electrode capacity by preventing an excessive addition of a conductive material or a binding material which occurs in an Mm hydrogen storage alloy electrode.

To achieve the above object, there is provided a fabrication method for a paste-type metal hydride electrode for a nickel/metal hydride battery comprising; pulverizing a V-Ti-Zr-Ni-type and Mm-type hydrogen storage alloy in which a small amount of Pd and Ru are combined; mixing a paste solution containing K.B.(KETJEN BLACK) or Ni powder, PTFE, and CMC or HPMC with the hydrogen storage alloy powder; filling the mixed paste in a porous nickel; drying the paste-filled nickel; and press-forming the dried paste-type electrode.

DETAILED DESCRIPTION OF THE PREFERRED EMBODIMENTS

To fabricate a paste-type electrode according to the present invention, the composition of the paste is important. An undiluted paste solution is made by the mixture of 1~10 wt. % of K.B(KETJEN BLACK) or Ni powder which serves as a conductive material even with a small amount of K.B since the density is low, 1~20 wt. % of PTFE(polytetrafluoro ethylene), 0.1~5 wt. % of CMC(carboxylmethyl cellulose) or HPMC(hydroxypropyl methyl cellulose). The paste which is filled in a porous nickel is composed of a mixture of 20~50 wt. % of an undiluted paste solution, and 50~80 wt. % of a hydrogen storage alloy powder. In addition, electrode capacity is improved by using a porous nickel having a three-dimensional structure as an electric collector and consequently achieving an excellent electrical conduction and the mechanical stability and a process ability of the electrode are enhanced. The appropriate porous nickel used in this process is 40~80ppi, which enables −325# hydrogen storage alloy powder in general use when fabricating the electrode to be well filled. The electrode is also coated with fluoride containing polymer such as PVdF and PTFE by spraying method which enhances the oxygen recombination capability and cycle life.

Although the V-Ti-Zr-Ni or Mm hydrogen storage alloy powder can be used in the conventional processes, the present invention has developed an electrode having a long cycle life and a high capacity, by developing a hydrogen storage alloy in which 0.005~2.0 wt. % of Pd and/or 0.005~2.0 wt. % of Ru are added to the conventional composition of the electrode and consequently preventing the dissolution and passivation of the electrode and increasing an electrochemical catalytic property. Although Pd and Ru are changed to an oxide in an alkaline solution, these materials are formed into a mixed oxide, with Ti, Ni, Mn, and V, which results in the prevention of dissolution and passivation of the electrode. Consequently, the cycle life and capacity of the electrode are improved and a high-rate discharge is enhanced since this oxide has excellent electrical conductivity and electrochemical catalytic property.

Figure 1:
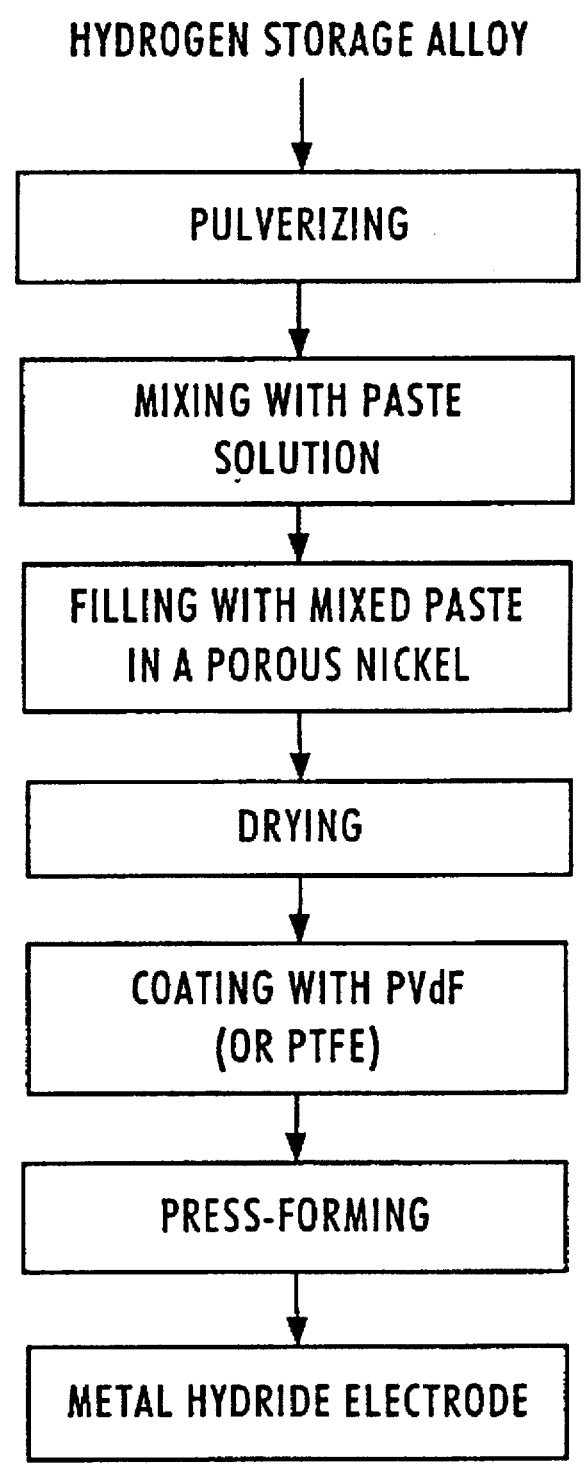
FIG. 1 is a process diagram showing a fabrication process for a metal hydride electrode according to the present invention.

The above-mentioned fabrication method of a paste-type metal hydride electrode according to the present invention will be described in more detail with reference to the fabrication process diagram in FIG. 1.

First, after hydride/dehydride process of hydrogen storage alloy obtained from a hot induction melting furnace or an arc-melting furnace and pulverizing the thus made material into −325#, 20~50 wt. % of an undiluted paste solution in which K.B.(or Ni powder)+PTFE+CMC(or HPMC) is mixed. Here, the paste undiluted solution is fabricated by mixing 1~10 wt. % of K.B. or Ni powder, 1~20 wt. % of PTFE, and 0.1~5 wt. % of CMC or HPMC with distilled water. The well-mixed paste is filled in a porous nickel and the paste-filled porous nickel is dried at a temperature of 120° C. for one hour. The paste-filled porous nickel is also coated with PVdF or PTFE by spraying of 0.1~5 wt. % PVdF or PTFE solution. The dried paste is press-formed under a pressure of 1~5 ton/cm² and finally the paste-type metal hydride electrode is fabricated.

Following is a description of an embodiment of fabricating a metal hydride electrode using the fabrication method of the present invention and testing a cell performance, from which the present invention will be more clearly understood.

EMBODIMENT 1

1 g of Mm $Ni_{3.5}$ $Co_{0.8}$ $Mn_{0.5}$ $Al_{0.3}$ of hydrogen storage alloy powder and 1 g of Mm $Ni_{3.5}$ $Co_{0.8}$ $Mn_{0.5}$ $Al_{0.3}$ $Pd_{0.1}$ $Ru_{0.1}$ which are pulverized to −325# pulverized are respectively mixed with 0.3 g of an undiluted paste solution of 5 wt. % of K.B.(or Ni powder)+10 wt. % of PTFE+2 wt. % of CMC(or HPMC) to obtain a paste. The thus made paste is filled in a 80 ppi foamed nickel and is allowed to dry and is coated with PVdF by spraying method and is then press-formed under a pressure of 2 ton/cm², by which process electrodes $A_1$, $A_2$ are fabricated.

COMPARATIVE EXAMPLE 1

1 g of the Mm $Ni_{3.5}$ $Co_{0.8}$ $Mn_{0.5}$ $Al_{0.3}$ hydrogen storage alloy powder of embodiment 1 is mixed with 0.1 g of copper powder having a size of −10 μm and 0.05 g of a 60% PTFE suspension, and the thus mixed material is applied to a 20# nickel screen, is dried and then is press-formed under a pressure of 2 ton/cm². This process results in the fabrication of an electrode $A_1'$. In addition, the identical hydrogen alloy powder which is microencapsulated with 10 wt. % copper is mixed with 0.05 g of 60% PTFE suspension, applied to a 20# of a nickel screen, the thus made material is dried and then is press-formed under a pressure of 2 ton/cm². This process results in the fabrication of an electrode A1".

EMBODIMENT 2

1 g of a hydrogen storage alloy powder having a composition of $V_{15}$ $Ti_{15}$ $Zr_{21}$ $Ni_{29}$ $Cr_5$ $Co_6$ $Mn_8$ and 1 g of a hydrogen storage alloy powder having a composition of $V_{15}$ $Ti_{15}$ $Zr_{21}$ $Ni_{29}$ $Cr_5$ $Co_6$ $Mn_8$ $Pd_{0.1}$ $Ru_{0.1}$ which are pulverized into −325# are mixed with 0.3 g of an undiluted paste solution of 5 wt. % of K.B. (or Ni powder) +10 wt. % of PTFE+2 wt. % of CMC(or HPMC), to obtain a paste. The thus made paste is filled in a 80 ppi foamed nickel and is allowed to dry and is coated with PVdF by spraying method, and is then press-formed under a pressure of 2 ton/cm², by which process electrodes $B_1$, $B_2$ are fabricated.

COMPARATIVE EXAMPLE 2

After a hydrogen storage alloy powder of $V_{15}$ $Ti_{15}$ $Zr_{21}$ $Ni_{29}$ $Cr_5$ $Co_6$ $Mn_8$ of the embodiment 2 is applied to a 20# nickel screen, the powder is pressed under a pressure of 10 ton/cm², by which process an electrode $B^1$ is fabricated.

Figure 2:
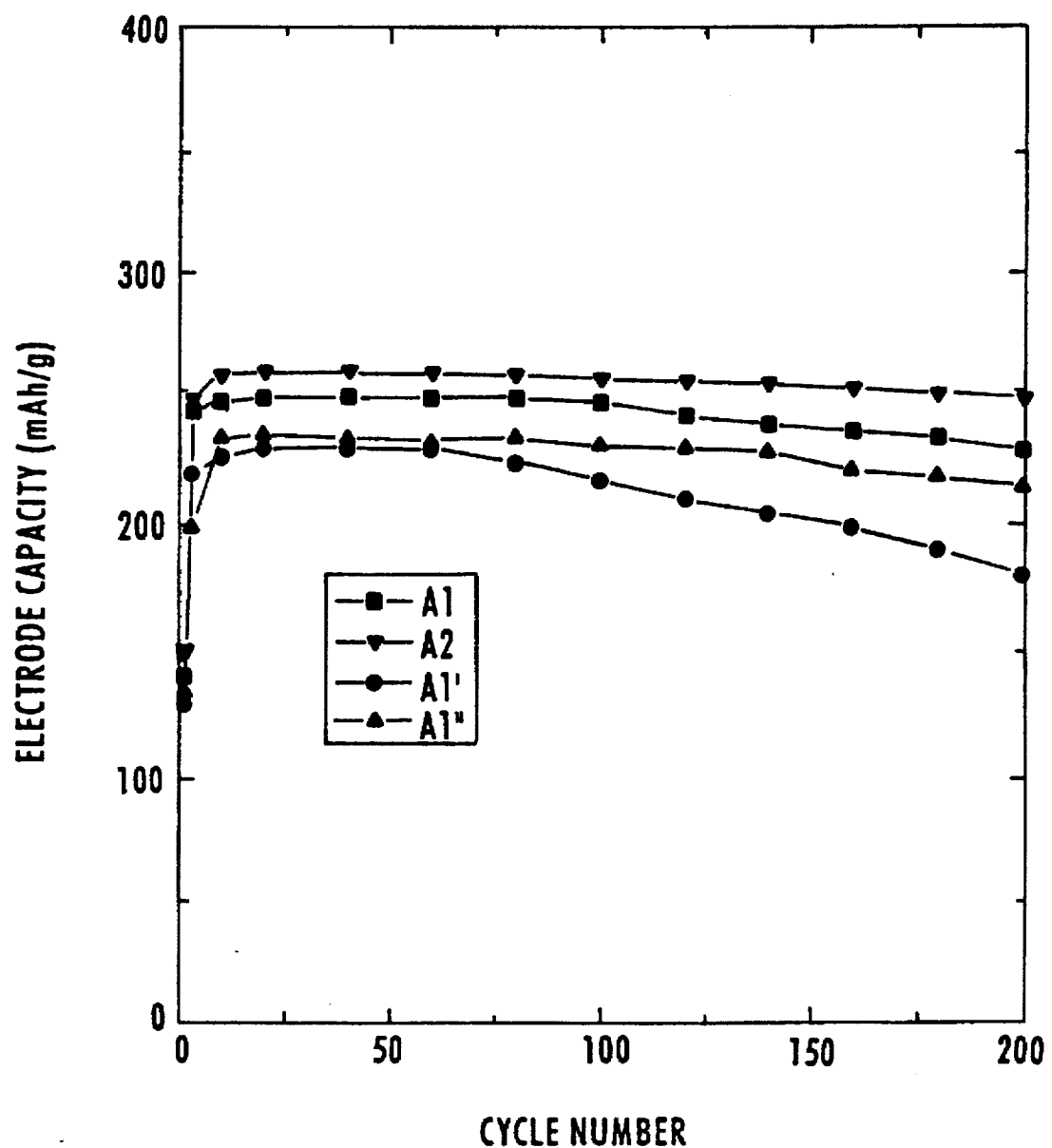
FIG. 2 is a graph illustrating a test result of an electrode capacity and cycle life of a paste-type Mm metal hydride electrode.
Figure 3:
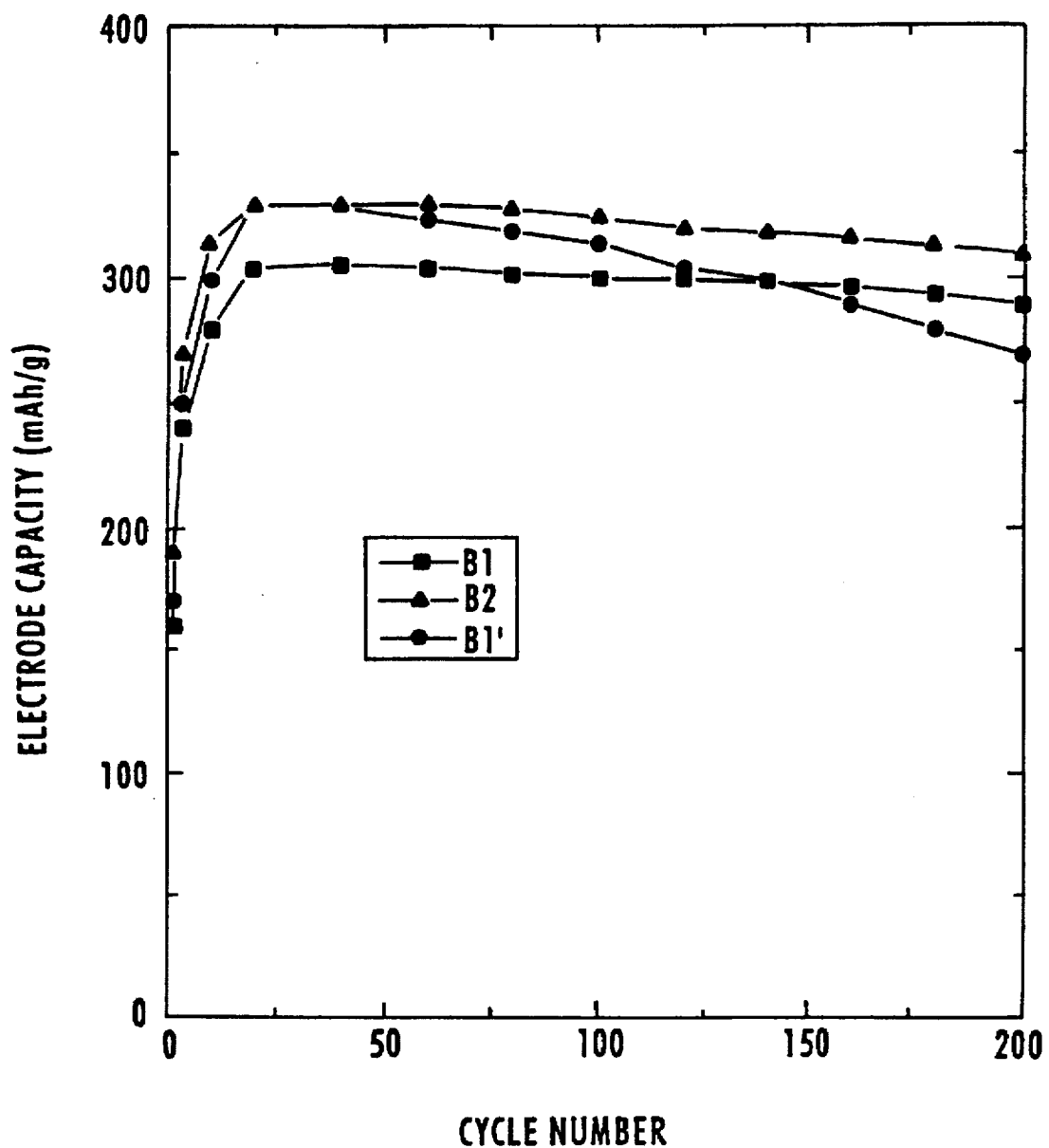
FIG. 3 is a graph showing a test result of electrode capacity and cycle life of a paste-type V-Ti-Zr-Ni metal hydride electrode.

FIG. 2 and FIG. 3 are graphs showing the results of a cell performance test of the electrode fabricated according to the above mentioned method carried out in 30% KOH+1M LiOH solution.

In the case of a hydrogen storage alloy powder of Mm $Ni_{3.5}$ $Co_{0.8}$ $Mn_{0.5}$ $Al_{0.3}$, the capacity of an electrode including a conductive material and a binding material, fabricated according to the present invention is 250 mAh/g, which figure indicates a capacity increase of approximately 15~20 mAh/g in comparison with the respective capacities 230 mAh/g and 235 mAh/g of electrodes $A_1'$ and $A_1"$ including a conductive material and a binding material, in the electrode of the comparative example 1 fabricated according to the conventional method. In addition, according to the results of 200 times of cycling tests, the electrode of the present invention has a longer cycle life than the electrode $A_1'$ and has almost the same cycle life as the electrode $A_1"$, which demonstrates a superiority of the electrode according to the present invention. The reason that the present invention has an increased electrode capacity is that the composition of the hydrogen storage alloy and the paste according to the present invention can diminish the amount of conductive material due to its excellent conductivity, and the cycle life of electrode is improved by preventing the detachment of electrode active material by micronizing of the hydrogen storage alloy.

In addition, in the case of an Mm $Ni_{3.5}$ $Co_{0.8}$ $Mn_{0.5}$ $Al_{0.3}$ $Pd_{0.1}$ $Ru_{0.1}$ alloy electrode, the electrode capacity of the electrode fabricated by the paste method according to the present invention is approximately 260 mAh/g, including a conductive material and a binding material, which means a capacity increase of approximately 25~30 mAh/g in comparison with the electrode of the comparative example 1. Besides, the cycle life of electrode has proved longer. The reason is that the dissolution and passivation of the hydrogen storage alloy is prevented and an electrochemical catalytic property has been improved by combining Pd and Ru. In the case of an alloy electrode composed of $V_{15}$ $Ti_{15}$ $Zr_{21}$ $Ni_{29}$ $Cr_5$ $Co_6$ and $Mn_8$ the capacity of the electrode fabricated by the paste method according to the present invention is approximately 305 mAh/g including a conductive material and a binding material and 25 mAh/g lower than press-type electrode, but the cycle life of electrode has turned out to be much longer. In the case of the hydrogen storage alloy according to the present invention, which is composed of $V_{15}$ $Ti_{15}$ $Zr_{21}$ $Ni_{29}$ $Cr_5$ $Co_6$ $Mn_8$ Pd0.1 and $Ru_{0.1}$ the capacity of the electrode fabricated from the paste composition is about 330 mAh/g including a conductive material and a binding material, which means that the electrode capacity is almost the same as the electrode of the comparative example 2 and the cycle life of electrode is much longer in comparison with the electrode of the comparative example 2.

As described above, due to the oxidation of electrode active material and poor conductivity it has been regarded as unfeasible to use a paste method as a fabrication method for an electrode of an $AB_2$ type alloy which is a V-Ti-Zr-Ni type. But according to the present invention, by using a paste-type electrode fabrication method in which the electrode capacity is significantly not lowered through the prevention of the oxidation of active material and poor conductivity, the present invention has the effect of preventing any significant decrease in electrode capacity; the remarkable increase of a cycle life of electrode, and the realization of an paste-type electrode fabrication of $AB_2$ type alloy in accordance with a new paste composition and a hydrogen storage alloy composition, which has been previously regarded as impossible.

What is claimed is:

1. A fabrication method for a paste-type metal hydride electrode for a nickel/metal hydride battery comprising;
   pulverizing a V-Ti-Zr-Ni-type and Mm-type hydrogen storage alloy in which 0.005~2.0 wt. % of Pd or Ru is combined;

mixing a paste solution containing KETJEN BLACK or Ni powder, PTFE, and CMC or HPMC with the hydrogen storage alloy powder;

filling the mixed paste in a porous nickel;

drying the paste-filled porous nickel; and press-forming the thus dried paste.

2. The fabrication method of claim 1, wherein said paste solution is composed of 1~10 wt. % of KETJEN BLACK or Ni powder, 1–20 wt. % of PTFE, and 0.1~5 wt. % of CMC or HPMC.

3. The fabrication method of claim 1, wherein said paste composition is composed of 20–50 wt. % of the paste solution and 50~80 wt. % of the hydrogen storage alloy powder.

4. The fabrication method of claim 1, wherein said porous nickel is 40~80 ppi.

5. The fabrication method of claim 1, wherein the dried paste is further coated with 0.1~5 wt. % PVdF or PTFE solution before the press-forming.

* * * * *